(12) United States Patent
Schulze et al.

(10) Patent No.: US 7,836,067 B2
(45) Date of Patent: *Nov. 16, 2010

(54) METHOD OF OBTAINING ELECTRONICALLY-STORED FINANCIAL DOCUMENTS

(75) Inventors: Michael D. Schulze, Troy, MI (US); Richard J. Gagnon, Grosse Pointe Farms, MI (US)

(73) Assignee: Mirror Imaging, LLC, Southfield, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/489,087

(22) Filed: Jun. 22, 2009

(65) Prior Publication Data

US 2009/0259668 A1 Oct. 15, 2009

Related U.S. Application Data (63) Continuation of application No. 11/202,790, filed on Aug. 12, 2005, now Pat. No. 7,552,118, which is a continuation of application No. 10/104,541, filed on Mar. 22, 2002, now Pat. No. 6,963,866, which is a continuation of application No. 09/548,490, filed on Apr. 13, 2000, now Pat. No. 6,446,072.

(60) Provisional application No. 60/129,021, filed on Apr. 13, 1999.

(51) Int. Cl.
*G06F 17/30* (2006.01)
(52) U.S. Cl. ........................ 707/765; 707/754; 707/766; 707/769; 707/821; 707/E17.062; 707/E17.069; 707/999.001; 707/999.005; 707/999.01; 707/999.205
(58) Field of Classification Search ........................ None
See application file for complete search history.

(56) References Cited

U.S. PATENT DOCUMENTS 3,872,448 A 3/1975 Mitchell, Jr.

(Continued)

FOREIGN PATENT DOCUMENTS

JP 3085649 A 4/1991

(Continued)

OTHER PUBLICATIONS

Article: Gladney, "A Storage Subsystem for Image and Records Management", IBM System Journal, vol. 32, No. 3, 1993, pp. 512-540, JDMI0000001-29.

(Continued)

*Primary Examiner*—Hung T Vy
*Assistant Examiner*—Andalib F Lodhi
(74) *Attorney, Agent, or Firm*—Howard & Howard Attorneys PLLC (57) ABSTRACT

A bank maintains a financial document in a first storage system when a record date is later than a pre-selected date and in a second storage system when the record date is earlier than or equal to the pre-selected date. The bank receives and inputs a request for the financial document from a client and compares the record date to the pre-selected date to determine if the record date is later than, earlier than, or equal to the pre-selected date. In processing the request, the bank can utilize a computer terminal, connected to the storage systems through a processing unit, to access one of the storage systems in response to the comparison of the record date to the pre-selected date. After accessing the appropriate storage system, the bank retrieves the requested financial document and can then reproduce and distribute the requested financial document.

68 Claims, 4 Drawing Sheets

U.S. PATENT DOCUMENTS

| | | | |
|---|---|---|---|
| 4,817,050 A | 3/1989 | Komatsu et al. | |
| 4,888,812 A | 12/1989 | Dinan et al. | |
| 4,899,299 A | 2/1990 | MacPhail | |
| 4,941,125 A | 7/1990 | Boyne | |
| 5,029,016 A | 7/1991 | Hiyama et al. | |
| 5,058,185 A | 10/1991 | Morris et al. | |
| 5,153,936 A | 10/1992 | Morris et al. | |
| 5,170,466 A | 12/1992 | Rogan et al. | |
| 5,187,750 A * | 2/1993 | Behera | 382/140 |
| 5,218,685 A | 6/1993 | Jones | |
| 5,247,660 A | 9/1993 | Ashcraft et al. | |
| 5,287,497 A | 2/1994 | Behera | |
| 5,301,350 A | 4/1994 | Rogan et al. | |
| 5,321,816 A | 6/1994 | Rogan et al. | |
| 5,325,511 A | 6/1994 | Collins et al. | |
| 5,339,311 A | 8/1994 | Turner | |
| 5,361,255 A | 11/1994 | Diaz et al. | |
| 5,506,986 A | 4/1996 | Healy | |
| 5,530,899 A | 6/1996 | MacDonald | |
| 5,548,770 A | 8/1996 | Bridges | |
| 5,550,976 A | 8/1996 | Henderson et al. | |
| 5,572,726 A | 11/1996 | Hasuo | |
| 5,584,008 A | 12/1996 | Shimada et al. | |
| 5,592,432 A | 1/1997 | Vishlitzky et al. | |
| 5,602,936 A | 2/1997 | Green et al. | |
| 5,649,196 A | 7/1997 | Woodhill et al. | |
| 5,678,042 A | 10/1997 | Pisello et al. | |
| 5,678,046 A | 10/1997 | Cahill et al. | |
| 5,706,457 A | 1/1998 | Dwyer et al. | |
| 5,727,164 A | 3/1998 | Kaye et al. | |
| 5,732,214 A | 3/1998 | Subrahmanyam | |
| 5,742,807 A | 4/1998 | Masinter | |
| 5,751,993 A | 5/1998 | Ofek et al. | |
| 5,783,808 A | 7/1998 | Josephson | |
| 5,784,610 A | 7/1998 | Copeland, III et al. | |
| 5,787,403 A | 7/1998 | Randle | |
| 5,806,078 A | 9/1998 | Hug et al. | |
| 5,813,009 A | 9/1998 | Johnson et al. | |
| 5,819,300 A | 10/1998 | Kohno et al. | |
| 5,825,506 A | 10/1998 | Bednar et al. | |
| 5,825,943 A | 10/1998 | DeVito et al. | |
| 5,860,066 A | 1/1999 | Rouse | |
| 5,870,725 A * | 2/1999 | Bellinger et al. | 705/45 |
| 5,895,455 A | 4/1999 | Bellinger et al. | |
| 5,897,643 A | 4/1999 | Matsumoto | |
| 5,901,228 A | 5/1999 | Crawford | |
| 5,917,958 A | 6/1999 | Nunally et al. | |
| 5,924,074 A | 7/1999 | Evans | |
| 5,926,623 A | 7/1999 | Tsukakoshi et al. | |
| 5,940,844 A | 8/1999 | Cahill et al. | |
| 5,949,492 A | 9/1999 | Mankovitz | |
| 5,953,729 A | 9/1999 | Cabrera et al. | |
| 6,023,710 A | 2/2000 | Steiner et al. | |
| 6,029,175 A | 2/2000 | Chow et al. | |
| 6,061,686 A | 5/2000 | Gauvin et al. | |
| 6,065,026 A | 5/2000 | Cornelia et al. | |
| 6,081,251 A | 6/2000 | Sakai et al. | |
| 6,097,834 A | 8/2000 | Krouse et al. | |
| 6,115,509 A * | 9/2000 | Yeskel | 382/309 |
| 6,124,878 A | 9/2000 | Adams et al. | |
| 6,157,930 A | 12/2000 | Ballard et al. | |
| 6,157,931 A | 12/2000 | Cane et al. | |
| 6,181,837 B1 | 1/2001 | Cahill et al. | |
| 6,212,303 B1 | 4/2001 | Doran et al. | |
| 6,236,661 B1 | 5/2001 | Ballard | |
| 6,236,767 B1 | 5/2001 | Altman | |
| 6,246,778 B1 | 6/2001 | Moore | |
| 6,269,380 B1 | 7/2001 | Terry et al. | |
| 6,269,382 B1 | 7/2001 | Cabrera et al. | |
| 6,308,179 B1 | 10/2001 | Petersen et al. | |
| 6,321,258 B1 | 11/2001 | Stollfus et al. | |
| 6,349,330 B1 | 2/2002 | Bernadett et al. | |
| 6,360,306 B1 | 3/2002 | Bergsten | |
| 6,366,930 B1 | 4/2002 | Parker et al. | |
| 6,446,072 B1 * | 9/2002 | Schulze et al. | 707/666 |
| 6,557,039 B1 | 4/2003 | Leong et al. | |
| 6,574,629 B1 | 6/2003 | Cooke, Jr. et al. | |
| 6,584,466 B1 | 6/2003 | Serbinis et al. | |
| 6,820,094 B1 | 11/2004 | Ferguson et al. | |
| 6,886,047 B2 | 4/2005 | Leong et al. | |
| 2001/0011336 A1 | 8/2001 | Sitka et al. | |
| 2001/0036324 A1 | 11/2001 | Altman | |
| 2002/0087443 A1 * | 7/2002 | Williams et al. | 705/35 |
| 2005/0256839 A1 | 11/2005 | Leong et al. | |

FOREIGN PATENT DOCUMENTS

| | | |
|---|---|---|
| JP | 07-064835 A | 3/1995 |

OTHER PUBLICATIONS

Article: Isaac, "Hierarchical Storage Management for Relational Database", Twelfth IEEE Symposium on Mass Storage System, Apr. 1993, pp. 139-144 JDMI0000059-65.

Article: Graf et al., "Application of a Mass Storage System to Science Data Management", Twelfth IEEE Symposium on Mass Storage Systems, Apr. 1993, pp. 191-198, JDMI0000030.

Article: Lash, "Requirements for Hierarchical Storage Management at AT&T Bell Laboratories", Twelfth IEEE Symposium on Mass Storage System, Apr. 1993, pp. 19-24. JDMI0000105.

Article: Moran et al., "The Restore-o-Mounter", USENIX Summer 1993 Technical Conference, pp. 45-58, JDMI0002230-2244.

Article: O'Niel et al., "A Log-Structured History Data Access Method (LHAM)", Sep. 4, 1993, pp. 1-9, JDMI0001167-1175.

Article: Mehring, Demonstration of Dissemination, Storage, and Retrieval of Defense Mapping Agency Digital Products over a Distributed Enterprise Network, SPIE Vo. 2368 Image and Information Systems, 1994, pp. 173-182, JDMI0000049-58.

Article: Schlatter et al., "The Business Object Management System", IBM Systems Journal, vol. 33, No. 2, 1994. pp. 239-263, JDMI0001186-1210.

Publication: Cincinnati Bell Information Systems et al., A Proposal for the Federal Reserve, CBIS, RFP#0729—Amended May 26, 1994, 307 pages, JDMI0003031-3337.

Publication: IBM Corp. Document and Check Image Solutions et al., "IBM Proposal for Federal Reserve Bank Check Image System", Jul. 8, 1994, 272 pages, JDMI0002458-2729.

Defendants Zions Bancorporation's Zions First National Bank's and Amegy Bank National Association's Second Supplemental Invalidity Contentions, Mirror Imaging, LLC, Plaintiff v. Suntrust Bank, Inc: et al., Defendants, Civil Action No. 2:08cv295, date Jan. 28, 2010, 6 pages.

Defendants' Invalidity Contentions, Mirror Imaging, LLC, Plaintiff v. Suntrust Bank, Inc: et al., Defendants, Civil Action No. 2:08cv295, date May 15, 2009, 36 pages.

Defendants' Supplemental Invalidity Contentions, Mirror Imaging, LLC, Plaintiff v. Suntrust Bank, Inc: et al., Defendants, Civil Action No. 2:08cv295, date Aug. 7, 2009, 17 pages.

Defendants' Markman Presentation, Mirror Imaging, LLC, Plaintiff v. Suntrust Bank, Inc: et al., Defendants, Civil Action No. 2:08cv295, no date, 114 pages.

Article: Lomet et al., "Access Method for Multiversion Data", Association for Computing Machinery, 1989, pp. 315-324 JDMI0001176-1185.

Article: Plesums et al., "Large-scale Image Systems: USSA case study", IBM System Journal, Vo. 29, No. 3, 1990, pp. 343-355, JDMI0002347-2359.

Article: Peterson, E-System Modular Automated Storage System (EMASS) Software Functionality, IEEE, 1991, pp. 73-76, JDMI0002342-2346.

Publication: Lomet et al., Media Recovery with Time-Split B-trees, Cambridge Research Laboratory, Technical Report Series, Oct. 16, 1991, CRL 91/9, 45 pages. JDMI0002185-2229.

Article: Sanders et al., "Performance Evaluation of a Picture archiving and communication Network Using Stochastic Activity Networks", IEEE Transactions on Medical Imaging, vol. 12, No. 1, Mar. 1993, pp. 21-29, JDMI0000631-641.
Publication: IBM Corp. IBM Payment Solutions et al., "Federal Reserve Bank of Boston Check Image Process and Archival and Retrieval Systems", Jul. 8, 1994, 504 pages, JDMI0001211-1714.
Article: Grossman et al., "Caching and Migration for Multilevel Persistent Object Stores", Fourteenth IEEE Symposium on Mass Storage Systems, Sep. 1995, pp. 127-135, JDMI0000039-47.
Article: Stephenson et al., "Impacts: An Interactive, Multiterabyte Image Archive", Fourteenth IEEE Symposium on Mass Storage Systems, Sep. 1995, pp. 146-161, JDMI0000066-82.
Publication: Image Archive Forum, Image Archive Requirements, Jul. 23, 1996, Revision 5, 44 pages., JDMI0004449-4492.
Article: Wooster et al, "Proxy Caching That Estimates Page Load Delays", Computer Networks and ISDN Systems #29, 1997, pp. 9777-9986, JDMI0000095-104.
Article: Kolodny et al., "A Low-Cost, Full-Function Picture Archiving and Communication System Using Standard PC Hardware and the Traditional 4-over-4 Display Format", Computers in Radiology, Apr. 28, 1998, Mar. 1999, pp. 591-594.
Publication: Mirror Imaging, LLC V. Suntrust Banks, Incl, et al., "Mirror Imaging's Claim Construction Presentation", "nbc, nelsonbumgardnercastro", 58 pages.
Final Chart: Invalidity Contentions for U.S. Pat. No. 7,552,118, Chart # 1, 15 pages.
Final Chart: Invalidity Contentions for U.S. Pat. No. 7,552,118, Chart # 2, 13 pages.
Final Chart: Invalidity Contentions for U.S. Pat. No. 7,552,118, Chart # 3, 16 pages.
Final Chart: Invalidity Contentions for U.S. Pat. No. 7,552,118, Chart # 4, 16 pages.
Final Chart: Invalidity Contentions for U.S. Pat. No. 7,552,118, Chart # 5, 14 pages.
Final Chart: Invalidity Contentions for U.S. Pat. No. 7,552,118, Chart # 6, 14 pages.
Final Chart: Invalidity Contentions for U.S. Pat. No. 7,552,118, Chart # 7, 12 pages.
Final Chart: Invalidity Contentions for U.S. Pat. No. 7,552,118, Chart # 8, 13 pages.
Final Chart: Invalidity Contentions for U.S. Pat. No. 7,552,118, Chart # 9, 12 pages.
Final Chart: Invalidity Contentions for U.S. Pat. No. 7,552,118, Chart # 10, 20 pages.
Final Chart: Invalidity Contentions for U.S. Pat. No. 7,552,118, Chart # 11, 21 pages.
Final Chart: Invalidity Contentions for U.S. Pat. No. 7,552,118, Chart # 12, 16 pages.
Final Chart: Invalidity Contentions for U.S. Pat. No. 7,552,118, Chart # 13, 10 pages.
Final Chart: Invalidity Contentions for U.S. Pat. No. 7,552,118, Chart # 14, 22 pages.
Final Chart: Invalidity Contentions for U.S. Pat. No. 7,552,118, Chart # 15, 12 pages.
Final Chart: Invalidity Contentions for U.S. Pat. No. 7,552,118, Chart # 16, 20 pages.
Final Chart: Invalidity Contentions for U.S. Pat. No. 7,552,118, Chart # 17, 16 pages.
Final Chart: Invalidity Contentions for U.S. Pat. No. 7,552,118, Chart # 18, 14 pages.
Final Chart: Invalidity Contentions for U.S. Pat. No. 7,552,118, Chart # 19, 15 pages.
Final Chart: Invalidity Contentions for U.S. Pat. No. 7,552,118, Chart # 20, 21 pages.
Final Chart: Invalidity Contentions for U.S. Pat. No. 7,552,118, Chart # 21, 18 pages.
Final Chart: Invalidity Contentions for U.S. Pat. No. 7,552,118, Chart # 22, 25 pages.
Final Chart: Invalidity Contentions for U.S. Pat. No. 7,552,118, Chart # 23, 10 pages.
Final Chart: Invalidity Contentions for U.S. Pat. No. 7,552,118, Chart # 24, 17 pages.
Final Chart: Invalidity Contentions for U.S. Pat. No. 7,552,118, Chart # 25, 12 pages.
Final Chart: Invalidity Contentions for U.S. Pat. No. 7,552,118, Chart # 26, 13 pages.
Final Chart: Invalidity Contentions for U.S. Pat. No. 7,552,118, Chart # 27, 16 pages.
Final Chart: Invalidity Contentions for U.S. Pat. No. 7,552,118, Chart # 28, 31 pages.
Final Chart: Invalidity Contentions for U.S. Pat. No. 7,552,118, Chart # 29, 17 pages.
Final Chart: Invalidity Contentions for U.S. Pat. No. 7,552,118, Chart # 30, 23 pages.
Final Chart: Invalidity Contentions for U.S. Pat. No. 7,552,118, Chart # 31, 16 pages.
Final Chart: Invalidity Contentions for U.S. Pat. No. 7,552,118, Chart # 32, 13 pages.
Final Chart: Invalidity Contentions for U.S. Pat. No. 7,552,118, Chart # 33, 23 pages.
Final Chart: Invalidity Contentions for U.S. Pat. No. 7,552,118, Chart # 34, 14 pages.
Final Chart: Invalidity Contentions for U.S. Pat. No. 7,552,118, Chart # 35, 25 pages.
Final Chart: Invalidity Contentions for U.S. Pat. No. 7,552,118, Chart # 36, 25 pages.
Final Chart: Invalidity Contentions for U.S. Pat. No. 7,552,118, Chart # 37, 17 pages.
Final Chart: Invalidity Contentions for U.S. Pat. No. 7,552,118, Chart # 38, 16 pages.
Final Chart: Invalidity Contentions for U.S. Pat. No. 7,552,118, Chart # 39, 9 pages.
Final Chart: Invalidity Contentions for U.S. Pat. No. 7,552,118, Chart # 40, 9 pages.
Final Chart: Invalidity Contentions for U.S. Pat. No. 7,552,118, Chart # 41, 9 pages.
Exhibit Chart: Invalidity Contentions for U.S. Pat. No. 6,963,866, Chart # 1, 28 pages.
Exhibit Chart: Invalidity Contentions for U.S. Pat. No. 6,963,866, Chart # 2, 23 pages.
Exhibit Chart: Invalidity Contentions for U.S. Pat. No. 6,963,866, Chart # 3, 25 pages.
Exhibit Chart: Invalidity Contentions for U.S. Pat. No. 6,963,866, Chart # 4, 23 pages.
Exhibit Chart: Invalidity Contentions for U.S. Pat. No. 6,963,866, Chart # 5, 25 pages.
Exhibit Chart: Invalidity Contentions for U.S. Pat. No. 6,963,866, Chart # 6, 26 pages.
Exhibit Chart: Invalidity Contentions for U.S. Pat. No. 6,963,866, Chart # 7, 22 pages.
Exhibit Chart: Invalidity Contentions for U.S. Pat. No. 6,963,866, Chart # 8, 19 pages.
Exhibit Chart: Invalidity Contentions for U.S. Pat. No. 6,963,866, Chart # 9, 24 pages.
Exhibit Chart: Invalidity Contentions for U.S. Pat. No. 6,963,866, Chart # 10, 37 pages.
Exhibit Chart: Invalidity Contentions for U.S. Pat. No. 6,963,866, Chart # 11, 33 pages.
Exhibit Chart: Invalidity Contentions for U.S. Pat. No. 6,963,866, Chart # 12, 27 pages.
Exhibit Chart: Invalidity Contentions for U.S. Pat. No. 6,963,866, Chart # 13, 18 pages.
Exhibit Chart: Invalidity Contentions for U.S. Pat. No. 6,963,866, Chart # 14, 35 pages.
Exhibit Chart: Invalidity Contentions for U.S. Pat. No. 6,963,866, Chart # 15, 20 pages.
Exhibit Chart: Invalidity Contentions for U.S. Pat. No. 6,963,866, Chart # 16, 35 pages.
Exhibit Chart: Invalidity Contentions for U.S. Pat. No. 6,963,866, Chart # 17, 22 pages.
Exhibit Chart: Invalidity Contentions for U.S. Pat. No. 6,963,866, Chart # 18, 22 pages.
Exhibit Chart: Invalidity Contentions for U.S. Pat. No. 6,963,866, Chart # 19, 24 pages.
Exhibit Chart: Invalidity Contentions for U.S. Pat. No. 6,963,866, Chart # 20, 30 pages.

Exhibit Chart: Invalidity Contentions for U.S. Pat. No. 6,963,866, Chart # 21, 28 pages.
Exhibit Chart: Invalidity Contentions for U.S. Pat. No. 6,963,866, Chart # 22, 32 pages.
Exhibit Chart: Invalidity Contentions for U.S. Pat. No. 6,963,866, Chart # 23, 17 pages.
Exhibit Chart: Invalidity Contentions for U.S. Pat. No. 6,963,866, Chart # 24, 28 pages.
Exhibit Chart: Invalidity Contentions for U.S. Pat. No. 6,963,866, Chart # 25, 22 pages.
Exhibit Chart: Invalidity Contentions for U.S. Pat. No. 6,963,866, Chart # 26, 22 pages.
Exhibit Chart: Invalidity Contentions for U.S. Pat. No. 6,963,866, Chart # 27, 24 pages.
Exhibit Chart: Invalidity Contentions for U.S. Pat. No. 6,963,866, Chart # 28, 31 pages.
Exhibit Chart: Invalidity Contentions for U.S. Pat. No. 6,963,866, Chart # 29, 24 pages.
Exhibit Chart: Invalidity Contentions for U.S. Pat. No. 6,963,866, Chart # 30, 32 pages.
Exhibit Chart: Invalidity Contentions for U.S. Pat. No. 6,963,866, Chart # 31, 23 pages.
Exhibit Chart: Invalidity Contentions for U.S. Pat. No. 6,963,866, Chart # 32, 18 pages.
Exhibit Chart: Invalidity Contentions for U.S. Pat. No. 6,963,866, Chart # 33, 35 pages.
Exhibit Chart: Invalidity Contentions for U.S. Pat. No. 6,963,866, Chart # 34, 24 pages.
Exhibit Chart: Invalidity Contentions for U.S. Pat. No. 6,963,866, Chart # 35, 33 pages.
Exhibit Chart: Invalidity Contentions for U.S. Pat. No. 6,963,866, Chart # 36, 42 pages.
Exhibit Chart: Invalidity Contentions for U.S. Pat. No. 6,963,866, Chart # 37, 26 pages.
Exhibit Chart: Invalidity Contentions for U.S. Pat. No. 6,963,866, Chart # 38, 30 pages.
Exhibit Chart: Invalidity Contentions for U.S. Pat. No. 6,963,866, Chart # 39, 14 pages.
Exhibit Chart: Invalidity Contentions for U.S. Pat. No. 6,963,866, Chart # 40, 16 pages.
Exhibit Chart: Invalidity Contentions for U.S. Pat. No. 6,963,866, Chart # 41, 16 pages.
Chart # 1, Invalidity Contentions for U.S. Pat. No. 6,963,866, 9 pages.
Chart # 2 Invalidity Contentions for U.S. Pat. No. 6,963,866, 10 pages.
Chart # 4, Invalidity Contentions for U.S. Pat. No. 7,552,118, 10 pages.
Chart # 5, Invalidity Contentions for U.S. Pat. No. 7,552,118, 8 pages.
PCT International Search Report for PCT/US00/09926 dated Aug. 22, 2000, 1 page.
Affidavit of Michael Schulze, Mirror Imaging, L.L.C., Plaintiff, v. Affiliated Computer Services, Inc. et al., Defendants: Civil Action No. 02-73629, Jul. 7, 2003, 3 pages.
Declaration of Michael Schulze, Mirror Imaging, L.L.C., Plaintiff, v. Affiliated Computer Service, Inc. et al., Defendants: Civil Action No. 02-73629, Aug. 28, 2003, 6 pages.
Plaintiff's Claim Construction Brief for Mirror Imaging, L.L.C. v Affiliated Computer Services, Inc. and ACS Image Solutions, Inc. and Affiliated Computer Services, Inc. v. Mirror Imaging, LLC filed Aug. 29, 2003.
Declaration of Stephen Gray, Mirror Imaging, L.L.C., Plaintiff, v. Affiliated Computer Services, Inc. et al., Defendants: Civil Action No. 02-73629, Sep. 25, 2003, 26 pages.
Combined Brief of Affiliated Computer Services, Inc. and ACS Image Solutions, Inc. in Support of Their Claim Constructions, Mirror Imaging, L.L.C., Plaintiff, v. Affiliated Computer Services, Inc. et al. Defendants: Civil Action No. 02-73629, Sep. 29, 2003, 25 pages.
Plaintiff'S Reply Brief to Combined Brief of Affiliated Computer Services, Inc. and ACS Image Solutions, Inc. in Support of Their Claim Constructions, Mirror Imaging, L.L.C., Plaintiff, v. Affiliated Computer Services, Inc. et al., Defendants: Civil Action No. 02-73629, Oct. 14, 2003, 9 pages.
Declaration of Charles W. Kight, Mirror Imaging, L.L.C. Plaintiff, v. Affiliated Computer Services, Inc. et al., Defendants: Civil Action No. 02-73629, Oct. 14, 2003, 10 pages.
Claim Construction Order, Mirror Imaging, L.L.C. Plaintiff, v. Affiliated Computer Services, Inc., Defendant: Case No. 02-CV-73629-DT, Mar. 8, 2004, 29 pages.
Brief for Appellant, Mirror Imaging, L.L.C. Plaintiff-Appellant, v. Affiliated Computers Services, Inc., et al. Defendant-Appellees: Case No. 2:02-CV-73629, Sep. 17, 2004, 22 pages.
Stipulation and Order Dismissing Certain Claims and Counterclaims, Mirror Imaging, L.L.C. Plaintiff, v. Affiliated Computer Services, Inc. et al., Defendants: Civil Action No. 02-73629, Sep. 17, 2004, 6 pages.
Affiliated Computer Services, Inc. & ACS Image Solutions, Inc.'s, Markman Hearing Presentation, Mirror Imaging, L.L.C. Plaintiff, v. Affiliated Computer services, Inc. et al., Defendant: Civil Action No. 02-73629, no date, 33 pages.
Original Answer and Counterclaim of Defendants Compass Bancshares, Inc. and Compass Bank, Mirror Imaging, LLC, Plaintiff, v. Suntrust Bank, Inc: et al. Defendants: Civil Action No. 2:08cv-295, Aug. 25, 2008, 10 pages.
Original Answer and Counterclaim of Defendants First Horizon National Corporation and First Tennessee Bank National Association, Mirror Imaging, LLC, Plaintiff v. Suntrust Banks, Inc; et al. Defendants, Civil Action No. 2:08cv-295, Aug. 25, 2008, 12 pages.
Cullen/Frost Bankers, Inc. and the Frost National Bank's Answer and Counterclaims, Mirror Imaging LLC, Plaintiff v. Suntrust Banks, Inc. et al., Defendants: Civil Action 2:08-CV-295, Aug. 26, 2008, 11 pages.
Answer and Counterclaim of Defendants Zions Bancorporation, Zions First National Bank and Amegy Bank National Association to Plaintiff's Original Complaint, Mirror Imaging LLC, Plaintiff, v. Suntrust Banks, Inc., et al. Defendants: Civil Action No. 2:08-CV-295, Sep. 24, 2008, 11 pages.
HSBC Defendants' Joint Answer and Counterclaims to Original Complaint, Mirror Imaging LLC., Plaintiff, v. Suntrust Bank, Inc. et al. Defendants: Civil Action No. 2:08cv00295 DF, Sep. 24, 2008, 22 pages.
Suntrust Banks, Inc.'s and Suntrust Bank's Answer and Counterclaims, Mirror Imaging LLC., Plaintiff, v. Suntrust Banks, Inc. et al., Defendants: Civil Action No. 2:08-CV-295, Oct. 7, 2008, 23 pages.
Article: ACS 0002294-2297, "Bank Has A Disaster But Survives—Here's How", Journal of The American Bankers Association, Nov. 1972, 5 pages.
Publication dated Oct. 1973, Burroughs Clearing House, entitled "Maximum Security For Financial Records", ACS 0001469-71, 3 pages.
Publication dated Nov. 1, 1976 from Forbes Magazine entitled "Dozier Willard's Crazy (Like a Fox) Idea".
Publication dated 1978, authors Caroline M. Eastman and Stephen F. Weiss, entitled "A Tree Algorithm For Nearest Neighbor Searching In Document Retrieval Systems".
Publication dated Aug. 1981, from the Communication of ACM vol. 24, No. 8, author Alan Jay Smith of University of California, Berkeley, entitled "Long Term File Migration: Development and Evaluation of Algorithms", JDMI000083-94, pp. 521-532.
Publication dated Aug. 15, 1989, from Datanation, vol. 35, No. 16, author Jeff Moad, entitled "The Networked Storage Game".
Brochure: ACS 0001585-1598, "The Business of Dataplex", Dataplex Corporation, 1990, 14 pages.
Brochure: ACS0001579-1584, "Dataplex Corporation: An Overview", 1991, 6 pages.
Brochure: ACS 0001571-1578, "Southern Vital Record Center", Dataplex Corporation, 1991, 8 pages.
Publication dated 1991, authors Vincent Cate and Thomas Gross, entitled Combining the Concepts of Compression and Caching for a Two-level File System.
Article: ACS0001391, ACS 0001755-1756, Glass, "Never Ending Disk—Version 2.0 Sytron", Info World, vol. 16, No. 49., 1994, 3 pages.
Publication dated Aug. 1994 from PC Magazine, author Steve Rigney, entitled "Palindrome HSM: Affordable and Flexible".

Publication dated 1995, from New Library World, authors Catherine Hare and Graham Southwood, entitled "Getting the Records Straight—Developments in Records Management".

Publication dated 1995, authors Jeong-Ki Kim and Jac-Woo Chang: entitled "A New Parallel Signature File Method For Efficient Information Retrieval".

Publication dated Feb. 1996, from ACM Transactions on Computer Systems, vol. 14, No. 1, pp. 108-136, authors John Wilkes, Richard Golding, Carl Staelin, and Tim Sullivan of Hewlett-Packard Laboratories, entitled The HP AutoRAID Hierarchical Storage System.

Publication dated Mar. 25, 1996, from Information Week, No. 572, pp. 77(6), author Neil Raden, entitled "Boost Warehouse Performances".

Holly Sraeel, article entitled "City Holdings Opts for DSI's Image" dated Mar. 1996 from Imaging, published in the U.S.A. 1 page.

Thierry Leger and Debra Leak, article entitled "IA Corp. Announces New CheckVision Products: New CheckVision Archive Software Supports Short-and Long-Term Check Image Archival With Dynamic, Multi-tiered Migration", dated Apr. 1, 1996, published in the U.S.A.

Article: ACS0001464, ACS 0001750-1754, Ballard, "Managing the Paper-Chain", Logistics Focus, vol. 4, No. 4, 1996, 6 pages.

Thierry Leger, Daniele Sweeney, Judith Hargrave and Joann Curran, article entitled "IA Corp. Uses Storage Tek Robotic Library for Fist Client/Server Check Image Archive at Union Bank of California; New client/server CheckVision Archive Application Stores Millions of Checks Per Day Using StorageTek Technology for Quicker Image Retrieval and On-line Client Viewing", dated Oct. 7, 1996), published in the U.S.A.

Publication dated Nov. 4, 1996, from Computerworld, author Alice LaPlante, entitled "Warehouse of Cards".

Publication dated 1996, author Daniel A. Menasce, Odysseas I. Pentakalos, and Yelena Yesha, entitled An Analytic Model of Hierarchical Mass Storage Systems With Network Attached Storage Divices.

Article entitled "Trans Financial Bank An Image Success Story Leveraging Technology to Revolutionize Item Processing". From Documents Solutions, a BISYS Company, dated 1996, 7 pages.

Presentation: Carreker 0914-923, "Mirror Imaging / ASI / Comerica Meeting"—Wednesday, May 28, 1997, Mirror Imaging, 10 pages.

Publication dated Mar. 18, 1998, from Documents Imaging Report, vol. 8, Issue 6, entitled "Sterling Integrates Storage Archives for Bank Documents".

Brochure: "M.I.R.R., MicroImagery Retention and Retrieval", Mirror Imaging, Apr. 16, 1998, 2 pages.

User Manual: Carreker 1082-1100, "Information Protection and Retrieval Services", Dataplex Information Services, no. date, 19 pages.

Alison P. Orenstein, article entitled "City National Bulks Up Its Internet Capability" from Community Bank Systems & Technology, dated May 1998, published in the U.S.A., 1 page.

Press Release: MI ACS 00735-736, "Mirror Imaging Announces Record Retention, Retrieval, and Disaster Recovery contract with Firstar Bank", Mirror Imaging, LLC, Jul. 6, 1998, 2 pages.

Article: MI ACS 00737, Marlin, "Firstar Taps Service Provider for Check R&A", Bank Systems +Technology, Oct. 1998, p. 56.

Press Release: MI ACS 00738, "Firstar Corporation Listed as Top Performing Bank of 1998", Newsalert.com, Jan. 7, 1999, 1 page.

Press Release: MI ACS 00733-734, "Patent Pending for Mirror Imaging's Remote Document Retention, Retrieval, And Disaster Recovery Business Methodology", May 5, 1999, 2 pages.

Article: MI ACS 00739-740, "NPC Check Services, Mirror Mirror . . . ", The Green Sheet, Issue 99:05:02, May 17, 1999, 3 pages.

Press Release: MI ACS 00750-752, "Carreker-Antinori, ACS and Eastman Kodak Announce Alliance to Provide Financial Institutions with Internet-based Digitized Check Image Capabilities", Multex Investor Network, May 19, 1999, 3 pages.

Press Release: Carreker 0769-772, Carreker-Antioni, ACS and Eastman Kodak Announce Alliance to Provide Financial Institutions with Internet-based Digitized Check Image Capabilities, Carreker-Antinori, May 19, 1999, 4 pages.

Article: MI ACS 00731-732, Newman, "Check Retrieval Service Duplicates Banks' Check Fulfillment Departments", The Business Journal, May 31, 1999, 2 pages.

Brochure: Mirror Imaging's Patent Pending, Proprietary Solution for Request Fulfillment & Disaster Recovery (Hot Site), Mirror Imaging, Jul. 7, 1999, 2 pages.

Article: MI ACS 00753-756, Brooks, "Bank One's Strategy As Competition Grows: New, Online Institution", The Wall Street Journal, No. 39, Aug. 25, 1999, 4 pages.

Article: Pasiecki, "Now is the Time to Make a Commitment to ECP", American Banker, Aug. 31, 1999, 4 pages.

Article: Carreker, "Banks and E-Commerce: Transforming Old Economy Practices into New Economy Businesses", Commercial Lending Review, Fall 2000, pp. 28-35.

Brochure: "CAPS—Microfilm Products People", Micrographic Sciences Inc., 2000, 2 pages.

Kristi Nelson, article entitled "UBOC Moves to New Check Archive System" from Bank Systems & Technology Issue dated Apr. 2000, published in the U.S.A.

On Line Article: "FujiFilm Unveils Three Second-Generation Software Products for its M Drive Microfilm Retrieval System", printed from creativepro.com , Apr. 14, 2000, 4 pages.

Press Release: MI ACS 00656, "Check Solutions Company Selected as Archive Vendor for Viewpointe Archive Services", Check Solutions, Nov. 1, 2000, 1 page.

Flyer: ACS 0001723-1724, "Vital Record Protection & Retention", Affiliated Computer Services (ACS), 2001, 2 pages.

Report: Grisby et al., "IBM Content Manger OnDemand, For Customer Service Solutions, An Industry Report", Imerge Consulting, 2001, pp. 1-21.

Brochure: CheckFree i-Series 4.0 Build or Buy: Comparison of Build versus Buy Methods for Evolving from Paper Bills to e-Billing, CheckFree i-Solutions, 2001,12 pages.

Article: MI ACS 00655, Bruno, "Leave Automation to Automators", U.S. Banker Buyer's Guide, 2001, 1 page.

Article: MI ACS 00784-785, Murphy, "Talk of the Show: Image Archive", U.S. Banker www.us-banker.com, 2001, 2 pages.

On Line Brochure: MI ACS 00912-930, "Welcome to Viewpoint". Viewpoint Archive Services, 2001, 19 pages.

Star Chek Press Release:, "Star Check Goes Live With online Check Verification", Dated Jan. 16, 2001, 2 pages.

Article: Luke, "Joint Effort?", BAI Online—Banking Strategies, vol. LXXVII, No. 1, Jan./Feb. 2001, 4 pages.

Brochure: "e.Vision Check", AFS—Advanced Financial Solutions, Mar. 2001, 2 pages.

Press Release: MI ACS 00883, "Chase launches i-Vault! image", News Showcase:kasina, Mar. 21, 2001, 1 page.

Brochure: MI ACS 00814-830, "Welcome to Viewpoint", Viewpointe Archive Services, May 22, 2001, 16 pages.

ImageMark Archive brochure from NCR Corporation, dated 2001, published in the U.S.A, 10 pages.

Brochure: "Silas Technologies' Image Archive Solutions Slashes Wachovia Costs, Transforms Backroom Processes, Front-line Service, e-Business", Silas Technologies, May 2001, 8 pages.

Presentation: MI ACS 00786-811, "The Cheque Forum—Pendley Manor Hotel, Tring, Hertfordshire", Viewpointe Archive Services, May 2001, 23 pages.

Paper "A Frame Work for Exchanging Image Returns" FRB/Industry Image Returns Task Force, Jul. 2001, 129 pages.

Article: McCoy, "The Checks Stop Here", Sacramento Business Journal, Nov. 18, No. 22, Aug. 10, 2001, 2 pages.

Article: King, "Put Electronic Information to Work for Your Organization", Fronters Check Solutions, vol. 3, No. 5, Sep. 28, 2001, 2 pages.

Press Release: MI ACS 00652-653, "HSBC Selects Viewpointe's National Image Archive for its Enterprise Imaging Strategy", Morningstar.com, Dec. 13, 2001, 2 pages.

Brochure: "ANFtechnology—Advanced Network Foldering", Micrographic Sciences, Inc., 2002, 5 pages.

Presentation: Micrographic Sciences, Inc., 2002, 19 pages.

Brochure: Check Image Capture Solutions, Carreker Corporation, 2002, 2 pages.

Brochure: "Seed to Benefit—First Tennessee's Fast Track to Imaging", Viewpoint Archive Services, 2002, 2 pages.
Article: Craig et al. "A Shift in Check Clearing and Settlement Technology", Endpoint Exchange, 2002, 2 pages.
Brochure: "The Image Cascade—Tapping into the image processing benefits stream, early and often", Carreker Corporation, 2002, 9 pages.
Press Release: MI ACS 00845-847 Carreker Releases "Near Papaerless" Adjustments System, Carreker, Jan. 14, 2002, 3 pages.
Press Release: MI ACS 00836, "Banking Consortium Releases Paperless Adjustments System", www.carreker.com, Jan. 15, 2002, 1 page.
Star Check Products & Services description of "Enhanced Check verification", retrieved from the Internet on Jan. 16, 2002.
Article: Dowdell, "Image Technology and the Changing Role of Banks", X9 Standard, Feb. 2002, 6 pages.
Article: Darwin, "Big banks, IBM launch venture to speed shift to check imaging", Houston Business Journal, Feb. 28, 2002, 2 pages.
Article: Tannenbaum, "BofA backing pushes check imaging system", American City Business Journals Inc., Mar. 1, 2002, 2 pages.
Press Release: MI ACS 00654, "US Patent And Trademark Office Issues Notice Of Allowance For Mirror Imaging's Method of Obtaining an Electronically-Stored Financial Document". Mar. 7, 2002.
Press Release: "Carreker's Adjustments / Express in Full Production At Wachovia Corporations's Wilkesboro Site", Apr. 1, 2002, 2 pages.
Press Release: MI ACS 00881-882, "JPMorgan Chase and ACS to Provide End-to-End Image Archiving and Retrieval Services", Company News-ACS, Apr. 16, 2002, 2 pages.
Article: MI ACS 00902-904, "Check Processing Gets A New Image", Bank Systems & Technology, May 2002, 3 pages.
Article: Bruno, "Digital Imaging Picks Up Steam", American Banker Online, May 1, 2002, 4 pages.
Press Release: "Zions Bancorporation and NetDeposit Make Strategic Decision to Partner with Viewpointe Archive Services for Check Imaging", May 2, 2002, 2 pages.
Article: Kingson, "Fed Rolling Out Imaging As It Pushes Truncation", American Banker, May 2, 2002, 3 pages.
Article: MI ACS 00897-898, Malhotra, "U.S. Bancorp Buying Stake In Viewpointe Check Venture", American Banker, May 8, 2002, 2 pages.
Press Release: "U.S. Bancorp Makes Strategic Investment and Signs Agreement with Viewpointe to Utilize its Image Archiving Service to Better Serve Customers", May 8, 2002, 1 page.
Article: MI ACS 00831-835, Marlin, "The Right Fit", Bank Systems & Technology, Jun. 3, 2002, 5 pages.
Article: Marlin, "The Right Fit—Creation: J.P. Morgan Chase", Bank Systems & Technology, Jun. 3, 2002, 3 pages.
Press Release: MI ACS 00844, "Carreker Grants Enterprise License for Archive Software to Viewpointe", CANI : Carreker Corp Company News, Jun. 2, 2002, 1 page.
Article: MI ACS 00848-851, Johnson et al., "Automated Research Solutions Increase Number of Cases Per Hour from 1 to 8", Bankers Online.com, Jun. 10, 2002, 4 pages.
Brochure: ACS 0001725-1727, "ACS Record Center Description and Specifications", Jun. 19, 2002, 3 pages.
Article: "Company Interview—Carreker Corporation", The Wall Street Transcript, Jul. 22, 2002, 4 pages.
Press Release: "Superregional West Coast Bank Selects Carreker Technology to Build In-House Check Image Archive", Carreker Corp Aug. 26, 2002, 3 pages.
Article: Looking for Fast, Easy Check Imaging? Try One of Our New FedImage Services, Fed Talk, Sep. 2002, 12 pages.
Press Release: MI ACS 00884-885, "Viewpointe To Speed Large Bank Image Projects With AFS eVision Check", Viewpointe Archive Services, Oct. 24, 2002, 2 pages.
Article: Rees et al., "The Emerging Electronic Payments Economy", The Journal Of Work Process Improvement, Dec. 2002, 2 pages.
Article: Hoffman, "Imaging Comes of Age", Banking Strategies, 2003, 4 pages.
Article: "Viewpointe—Forging New Territory", The Exchange, vol. 1, No. 1, 2003, 5 pages.
Brochure: MI ACS 00889-896, "Banking industry benefits from new image archiving model", Viewpointe Archive Service, 2003, 8 pages.

Brochure: "The Future of Day 2 Processing", Viewpointe Archive Services, 2003, 3 pages.
Report: Siegmann et al., "Safekeeping And Electronification In The Financial Services Industry", BITS Financial Services Round Table, Jan. 2003, 19 pages.
Brochure: "Banking On The Archive—Defining a Strategic Approach to Managing a Payment Archive", Global Concepts, Spring 2003, 6 pages.
Press Release: "Viewpointe and SVPCo to Advance Image Exchange For Financial Services Industry", Mar. 3, 2003, 2 pages.
Article: Raghunathan, "A new look for check processing", The Dallas Morning News, Mar. 3, 2003, 5 pages.
Press Release: MI ACS 00886 "Viewpointe teams with check-service firm", Charlotte Business Journal, Mar. 5, 2003, 1 page.
Press Release: MI ACS 00887, "Chase Bank Offers Check-Image Service", Mar. 28, 2003, 1 page.
Article: "Wells Fargo Chooses Carreker Image Capture and Archive Software", Carreker Corp., Apr. 22, 2003, 2 pages.
Article: Mearian, MI ACS 00855-858,"Check 21 bill spurs check imaging adoption by banks", Computer World, Apr. 23, 2003, 4 pages.
Brochure: MI ACS 00860-869, 00871-876, "Everyone's Back Office Is Someone Else's Front Office", Carretek, 16 pages.
Press Release: MI ACS 00644-645, "Sterling Commerce Selected to Provide Key Element of SVPCo Image Exchange Network", May 7, 2003, 2 pages.
Article: MI ACS 00859,Chen , "ACS settles patent infringement suit", Dallas Business Journal, Jun. 3, 2003, 1 page.
Article: Costanzo, "Banks Busy with Check 21, Even If Congress Isn't", American Banker, Jun. 10, 2003, 3 pages.
Brochure: "ITMS—Image & Transaction Management System", RDM Corporation, Jun. 2003, 2 pages.
Report: "MSI User Conference", CheckWorks Inc.com, Nov. 17-18, 2003, 5 pages.
Article: "SunTrust Implements CheckWorks' Image Batch Retrieval and Batch Store", CheckWorks Inc., Nov. 18, 2003, 2 pages.
Article: "CheckWorks Offers Its Batch Software", American Banker, Dec. 3, 2003, 1 page.
Brochure: "Express Research—Overview", Carreker Corporation, 2004, 3 pages.
Article: Adams, "Direct Access—Nat City's New Image", Bank Technology News, vol. 17, No. 1, Jan. 2004, 2 pages.
Press Release: Viewpointe Bank Customers Retrieve Over 650 million Check in 2003, Viewpointe, Jan. 13, 2004, 3 pages.
Press Release: "Bank Imaging Solution Available", ProQuest Information and Learning Company, Feb. 2004, 1 page.
Article: Hunt, "Should Large U.S. Banks Outsource Their Check Processing?", TowerGroup, Mar. 23, 2004, 4 pages.
Article: Wade, "Lettko: Many Banks Lack Strategic Check 21 Plan", American Banker, Jul. 2004, 3 pages.
Article: Fonseca, "Banks get the picture", eWeek, Sep. 6, 2004, 1 page.
Article: Strom, "Banks canceling canceled checks", WorldNetDaily, Sep. 21, 2004, 13 pages.
Article: O'Neill, "Archiver keeps big banks in check", Search storage.com, Sep. 30, 2004, 1 page.
Brochure: "The Domino effect of Check 21", Carreker Corporation, Oct. 2004, 10 pages.
Brochure: "Carreker—Payments Technology", Carreker Corporation, 2005, 2 pages.
Article: Bunge, "Statistical Image Quality Assessment: Digital Vs. Microfilm, An iSixSigma Case Study", National City Corp., 2005, 5 pages.
Article: Quick et al., "Ending Digital Obsolescence", The Society for Imaging Science and Technology, Jan. 20, 2005, 6 pages.
Article: Daniel, "Wachovia Corporation—Case Study, Transaction and Image Archive software makes managing data simple, predictable and reliable", StorageTeck, Feb. 2005, 2 pages.
Article: "Is Outsourcing Check Processing Cost Effective?", Harpreet Arora, Infosys Technologies Limited, Mar. 14, 2005, 4 pages.
Article: Bills "Viewpointe Scrapping Single-Archive Approach", American Banker, May 6, 2005, 2 pages.

Tom Dwyer, publication entitled "Archiving Digital Content With EMC and Mobius Solutions", dated Dec. 2005 from Yankee Group Research, In., www.yankeegroup.com, published in the U.S.A., 16 pages.

Article: Bolita, "The Many Tools of Transaction Processing", The Journal of Work Process Improvement, Sep./Oct. 2006, pp. 10-13.

Article: Kincade, "The New Payments Environment", The Journal of Work Process Improvement, Jan./Feb. 2008, pp. 10-13.

Article: Kener, "Taking COLD To The Bank", Document Management/Imaging Installation Review, no date, 1 page.

* cited by examiner

FIG - 4

METHOD OF OBTAINING ELECTRONICALLY-STORED FINANCIAL DOCUMENTS

RELATED APPLICATIONS

This patent application is a continuation of U.S. patent application Ser. No. 11/202,790 filed on Aug. 12, 2005, now U.S. Pat. No. 7,552,118, which is a continuation of U.S. patent application Ser. No. 10/104,541 filed on Mar. 22, 2002, now U.S. Pat. No. 6,963,866, which is a continuation of U.S. patent application Ser. No. 09/548,490 filed on Apr. 13, 2000, now U.S. Pat. No. 6,446,072, which in turn claims priority to and all the advantages of U.S. Provisional Patent Application Ser. No. 60/129,021, which was filed on Apr. 13, 1999.

BACKGROUND OF THE INVENTION

1) Technical Field

The subject invention relates to a method for a financial institution to obtain electronically-stored financial documents from an off-site storage system remotely-located from an on-site storage system.

2) Description of the Prior Art

Methods for obtaining electronically-stored financial documents are generally known in the art. Financial institutions, such as banks and credit unions, utilize such methods to rapidly and efficiently obtain financial documents for distribution to clients upon request. Such financial documents include paid checks, account statements, and other related documents. These financial documents are typically stored on microfiche, microfilm, digitally, or by some other electronic storage means. Further, these financial documents are typically electronically-stored in an on-site storage system located at the financial institution or in an off-site storage system. Electronic storage of these financial documents permits financial institutions to eliminate storage of paper or "hard" copies of these documents. The electronic storage of these documents also provides a means of retrieving the information from the on-site and off-site storage systems.

Once the document is stored, the client may request an image of a particular stored document. Client requests are made to replace lost or stolen documents, for tax purposes, for proof of financial transactions, for legal disputes, and other similar matters. The client's request is inputted into a computer terminal at the financial institution. More specifically, conventional methods for obtaining an electronically-stored financial document enable an employee of the financial institution, such as a bank teller, to input the request into an interface incorporated into the computer terminal. The interface is inter-linked with the on-site storage system. Typically, all requests for a particular period are grouped together and subsequently downloaded for retrieval of the requested image by the financial institution. The financial institution retrieves the image, e.g. a photocopy of the check, and then distributes the photocopy to the client via facsimile, mail or hand delivery. The storing, downloading, and retrieving of the financial document, including the reproduction and the distribution of the document, are known in the industry as back office production. Back office production for financial institutions is particularly resource intensive, time consuming, and expensive. Also, back office production becomes increasingly expensive if the client requests a particularly old financial document because older financial documents frequently require more resources and time to locate and retrieve.

The majority of financial institutions electronically store financial documents only in an on-site storage system and not in an off-site storage system. Consequently, these financial institutions are unable to outsource the responsibilities for the back office production to third party entities to alleviate the expenses and resources associated with the back office production. These financial institutions realize a significant financial burden since the back office production is concentrated strictly at the financial institution.

Other financial institutions do electronically store financial documents in on-site and off-site storage systems. However, the methods utilized by these financial institutions to access the financial documents stored in the off-site storage system are deficient in that the interface utilized in such methods is only inter-linked with the on-site storage system. That is, there is no interface independently inter-linked with the off-site storage system. As a result, the financial documents stored in the off-site storage system can not be efficiently accessed. These financial institutions are still responsible for retrieving the requested financial documents through their back office production and their expenses remain high. One such method of retrieving documents from on-site and off-sited storage systems is disclosed in U.S. Pat. No. 5,784,610 to Copeland, III et al.

Due to the inefficiencies identified in the conventional methods used by financial institutions to obtain financial documents, it is desirable to implement a method for a financial institution to obtain electronically-stored financial documents from both on-site and off-site storage systems that reduces, if not eliminates, the back office production of the financial institution by providing a direct interface inter-linked with the off-site storage system. With such an interface, the responsibility for retrieving financial documents from the off-site storage can be outsourced to third party entities while still providing the financial institution with efficient access to any financial documents electronically-stored in the off-site storage system.

SUMMARY OF THE INVENTION AND ADVANTAGES

A method for a financial institution to obtain electronically-stored financial documents having a specific document parameter is disclosed. The specific document parameter is typically a particular numerical sequence, such as a record date of the financial document. The method of the subject invention enables the financial institution to obtain the financial documents from a first or an off-site storage system. The first or off-site storage system is different from a second or an on-site storage system and is preferably remotely-located from the second or on-site storage system. In one embodiment, the financial documents of the financial institution are maintained in the first or off-site storage system when the specific document parameter of the financial document is greater than a predetermined parameter. The financial documents that are less than or equal to the predetermined parameter are maintained in the second or on-site storage system. In another embodiment, the specific document parameter of the financial document that is less than or equal to the predetermined parameter is maintained in the first or off-site storage system and the financial document that is greater than the predetermined parameter is maintained in the second or on-site storage system.

When the financial institution receives a request for a financial document, the financial institution compares the specific document parameter of the requested financial document to the predetermined parameter to determine if the specific document parameter is greater than, less than, or equal to the predetermined parameter. A computer terminal located at the financial institution is connected to both the off-site and on-site storage systems through a processing unit. The processing unit is utilized to, at least partially, automatically access one of the storage systems in response to the comparison of the specific document parameter to the predetermined parameter. For instance, if it is determined that the specific document parameter is less than or equal to the predetermined document parameter, then the processing unit accesses the second or on-site storage system. On the other hand, if it is determined that the specific document parameter of the financial document is greater than the predetermined parameter, then the processing unit accesses the first or off-site storage system. As stated below, the computer terminal may be used to feed a request into the processing unit.

After the requested financial document is accessed, the requested document is then retrieved in order to reproduce the financial document, and distribute the financial document to an end user of the financial institution.

The subject invention therefore provides a method that enables financial institutions to obtain electronically-stored financial documents from on-site and off-site storage systems As such, the financial institution can selectively store financial documents in either an on-site storage system or the off-site storage system, and the responsibility for the financial documents in the on-site or off-site storage systems can be outsourced to a third party entity. Further, the documents can be stored in different fixed mediums, such as microfiche, microfilm, digitally, electronically, etc., and can be stored in different geographical locations. Therefore, the back office production of the financial institution associated with the retrieval and distribution of financial documents stored in the on-site or off-site storage systems is strategically reduced or even completely eliminated.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
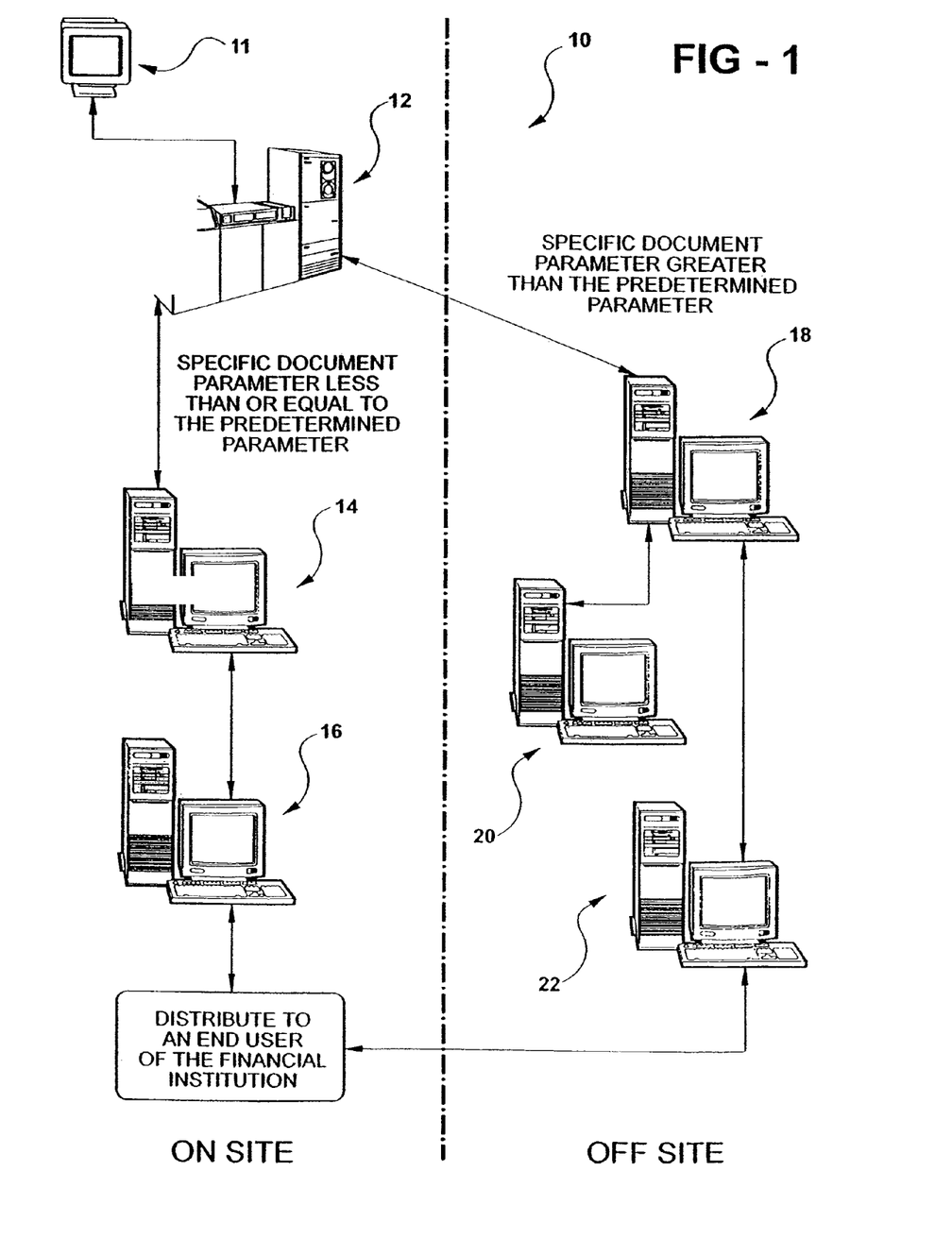
FIG. 1 is a flow diagram schematically detailing an on-site storage system, and an off-site storage system in accordance with the subject invention.

Referring to the Figures, wherein like numerals indicate like or corresponding parts throughout the several views, a method for a financial institution to obtain an electronically-stored financial document is schematically shown at 10 in FIG. 1. The method introduced in the subject invention enables the financial institution to obtain the financial document from one of a first or an off-site storage system and a second or an on-site storage system with the storage systems being different from each other. Preferably, the on-site storage system is located at the financial institution and the off-site storage system is located at a remote location distant from the financial institution. This allows the financial institution to 'outsource' the responsibilities associated with obtaining the financial document.

Methods for financial institutions to obtain electronically-stored documents are frequently used by such entities as banks, credit unions, and other financially-oriented institutions. For illustrative purposes only, the description of the subject invention is discussed with reference to banks. However, as appreciated by those skilled in the art, other businesses, such as insurance companies, may also utilize similar methods and incorporate the aspects of the subject invention.

Methods for banks to obtain electronically-stored financial documents are generally used by banks to rapidly and efficiently obtain financial documents for distribution to clients upon request. As described above, the financial documents for banks are usually paid checks, checking statements, and other related financial documents, and these documents include at least one specific document parameter. As appreciated by those skilled in the art, it is not the financial document (e.g. the paid check) itself that is electronically-stored. Rather, it is data included on the document such as a sequence number that is electronically stored to make up the financial document. The specific document parameter is preferably a particular numerical sequence. As appreciated, the specific document parameter of the financial document can include, but is not limited to, a record date or age of the document, a series number, or some other document identifying number of the financial document. More specifically, in the preferred embodiment of the subject invention, the particular numerical sequence of the financial document is the record date of the financial document. That is, the date that the particular financial document was created or posted.

The financial documents are typically stored on microfiche, microfilm, digitally, or by some other electronic storage means. As appreciated, the electronic storage of the financial documents is frequently created by taking an electronic photo image of the document and storing the photo image in a computer system. One such digital electronic storage device is sold by Kodak under the name of IMAGELINK™ Digital Workstation (IDW). Electronic storage of these financial documents permits banks to eliminate storage of paper or "hard" copies of these documents. The electronic storage of these documents also provides an efficient means of retrieving the information from the on-site and off-site storage systems. This will be discussed further herein below.

As described above, the financial documents are electronically-stored in either the on-site storage system located at the bank or in the off-site storage system remotely located from the on-site storage system. More specifically, the subject invention includes the step of maintaining the financial documents in the off-site storage system when the specific document parameter of the financial document is greater than a predetermined parameter. Financial documents are maintained in the on-site storage system when the specific document parameter of the financial document is less than or equal to the predetermined parameter. As appreciated, the document parameter of the financial documents stored in the off-site storage system may be greater than or equal to the predetermined parameter with the on-site storage system having documents only less than the predetermined parameter.

Similar to the specific document parameter of the financial document, the predetermined parameter is also a numerical value. The predetermined parameter is specifically a numerical value predetermined by the bank. For instance, if the specific document parameter is a series number of a paid check and the series number is greater than the predetermined parameter which, in this case, would be an arbitrarily selected base series number, then the paid check would be stored in the off-site storage system.

In the preferred embodiment of the subject invention, the predetermined numerical value is a date pre-selected by the bank. For instance, the bank may pre-select a date that is one year before a current date—the current date being the actual date that the client requests the financial document. Of course, the bank may pre-select a date that is some other time period before a current date (e.g. two or three years) without varying from the scope of the subject invention. As such, if the record date of the particular financial document is older than one year, then the particular financial document is maintained in the off-site storage system. If the record date of the particular financial document is earlier than or equal to one year, then the particular financial document is maintained in the on-site storage system. As discussed above, the document having record dates equal to the one year may be stored in the off-site or on-site storage systems.

Once the financial document is maintained in the appropriate storage system, the bank is capable of receiving a request for the financial document from the client. In reality, the client is requesting an image of the stored financial document. As appreciated, clients request the image for various reasons. As discussed above, requests are typically made for replacing lost or stolen financial documents, for tax purposes, for proof of financial transactions, for legal disputes, and other similar matters. Ultimately, the bank retrieves the image, reproduces the image, and distributes the reproduced image to the requesting client of the bank.

Referring now to FIG. 1, the method for banks to obtain electronically-stored financial documents is discussed in detail in accordance with a general scope of the subject invention. Initially, the requesting client requests a particular financial document, such as a paid check. The client is typically a customer of the bank or other financial institution. The client's request is inputted into a computer terminal 11 at the financial institution. The computer terminal 11 will be discussed in more detail hereinbelow.

From the computer terminal 11, the request is fed into a processing unit 12, which is illustrated as a mainframe computer 12 at the bank. In the preferred embodiment of the subject invention, if the client requests a financial document having a record date earlier than or equal to one year before the current date, then the request, and other requests like it, are processed at the bank in the on-site storage system. That is, the requests are grouped together and downloaded to a downloading terminal 14 at the bank. The downloading may occur at particular intervals such as at the end of each day, every three hours, etc. The sequence number of each check requested is then determined. A document terminal 16 subsequently creates or reproduces the document, i.e., a photocopy of the check. The photocopy is then distributed to the client via facsimile, mail, or hand delivery.

It is known in the art that the majority of requests for financial documents are requests for documents which were created in the most recent year. That is, if the pre-selected date is one year before the current date, as in the preferred embodiment, then the majority of requests are seeking financial documents having a record date earlier than or equal to the pre-selected date. The remaining document requests relate to financial documents that are older than one year. Since, as described in the Background of the Invention, retrieval of financial documents that are older than one year is particularly expensive, the preferred embodiment of the subject invention outsources all of the document requests which relate to documents having a record date later than one year before the current date. As appreciated, the particular time frame which is outsourced is not a critical feature of the subject invention and may be adjusted to meet the needs of any particular financial institution. In fact, all of the document requests, including the most recent, may be outsourced using the outsourcing procedure of the subject invention.

In the preferred embodiment, if the client requests a financial document having a record date later than one year before the current date, then the request, and others like it, are grouped together and downloaded from the mainframe computer 12 to an outsourced downloading terminal 18. As above, the downloading may be at particular intervals as needed. The sequence number is determined by a sequencing terminal 20. The sequence number is then sent back to the outsourced downloading terminal 18. An outsourced document terminal 22 then creates or reproduces the desired document which is then distributed to either the client or the bank. As appreciated, two document retrieval operations, one for the bank to retrieve financial documents having record dates earlier than or equal to one year before the current date, and another to retrieve outsourced financial documents having record dates later than one year before the current date, preferably operate simultaneously. It is to be understood that the computer terminals and the accompanying PC bases are illustrated highly schematically in FIG. 1 and are not intended to be limiting in any manner. For instance, the schematic illustration of the outsourced document terminal 22 need not include a computer terminal and an accompanying PC base. Instead, the outsourced document terminal 22 is preferably some sort of printing device.

Figure 2:
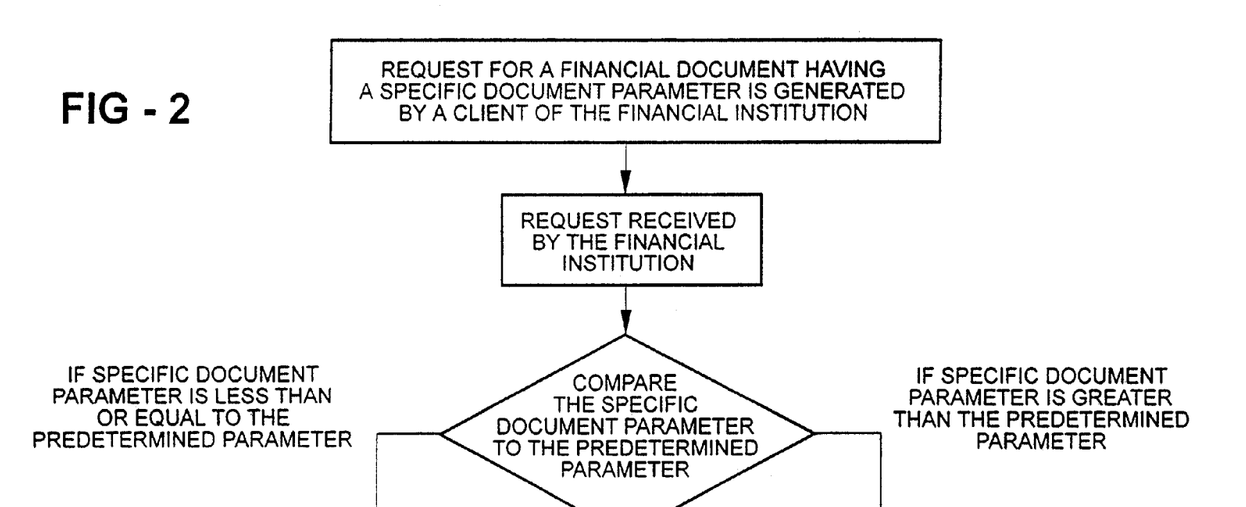
FIG. 2 is a block diagram generally representing a method for a financial institution to obtain electronically-stored financial documents from the on-site and off-site storage systems.
Figure 3:
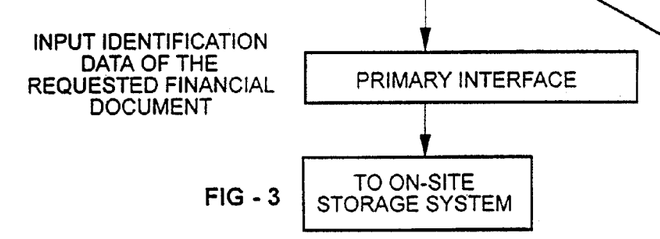
FIG. 3 is a block diagram completing the method of obtaining electronically-stored financial documents from the on-site storage system.
Figure 4:
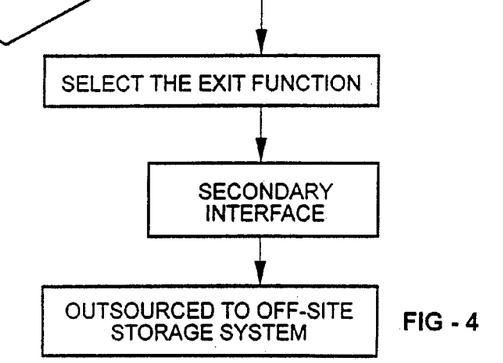
FIG. 4 is a block diagram completing the method of obtaining electronically-stored financial documents from the off-site storage system.

Referring to FIGS. 2 through 4, the method for banks to obtain electronically-stored financial documents is described in even greater detail. The request is first generated by the client. The request is then processed by the bank. The processing, retrieval and reproduction of the requested financial document is typically controlled by one interlinked computer software program. One such computer software program is a software program called Antinori Software Incorporated or ASI which is sold under the name of INNOVASION™ by Carreker-Antinori of Dallas, Tex. However, other frequently used software programs include PEGA™ and Sterling™. Any of these computer software systems can provide the necessary means for implementing the discussed procedures.

The processing of the request is completed by a customer service tracking system and the computer terminal 11. The customer service tracking system assists the financial institution in receiving the request. More specifically, the customer service tracking system gives branches, customer service, and other bank departments the capability to enter, log, track, route and monitor the status of all requests for financial documents. The customer service tracking system also provides the capability to enter, log, track, route and monitor the status of customer complaints and other customer service related items.

In accordance with one contemplated embodiment of the invention, a bank employee, such as a bank teller first determines a status of the requested document. More specifically, the employee compares the specific document parameter of the requested financial document to the predetermined parameter to determine if the specific document parameter is greater than, less than, or equal to the predetermined parameter. If the specific document parameter is a particular numerical sequence and the predetermined parameter is a predetermined numerical value, then the employee compares the particular numerical sequence of the financial document to the predetermined numerical value to determine if the particular numerical sequence is greater than, less than, or equal to the predetermined numerical value. Further, if as in the preferred embodiment, the particular numerical sequence is a record date of the financial document, and the predetermined numerical value is a pre-selected date, then the employee compares the record date of the financial document to the pre-selected date to determined if the record date is later than, earlier than, or equal to the pre-selected date.

The customer service tracking system enables a bank employee, such as a bank teller, to submit the request. More specifically, the employee utilizes the computer terminal 11 located at the bank and connected to both the off-site and on-site storage systems to access one of the storage systems in response to the comparison of the specific document parameter of the requested financial document to the predetermined parameter. For instance, when the particular numerical sequence of the financial document is greater than the predetermined numerical value, the employee preferably utilizes the computer terminal 11 to access the off-site storage system, and when the particular numerical sequence of the financial document is less than or equal to the predetermined numerical value, the employee preferably utilizes the computer terminal 11 to access the on-site storage system. As discussed above, the documents have a numerical sequence equal to the predetermined numerical value may be stored in either the off-site or on-site storage systems.

After the computer terminal 11 is utilized to access the desired storage system, the employee manually inputs identification data of the requested financial document into the computer terminal 11. More specifically, when the particular numerical sequence of the financial document is less than or equal to the predetermined numerical value, the employee inputs identification data into a primary interface and selects the requested document. Also, the primary interface preferably provides an option for the employee to select among several different output formats. The primary interface is inter-linked with the on-site storage system. In the preferred embodiment of the subject invention, the primary interface appears as follows and includes the identification data detailed below:

| Account Number: | Prod Type: |
| --- | --- |
| Account Name: | Customer Code: |
| Address: | |
| City: State: | Zip Code: |
| Home Phone: ( ) | Work Phone: ( ) |
| Fax: ( ) | |
| Service Code: | |
| For Items Posted Within A Year | |
| Copy of Statement Only | Savings Items |
| Copy of Check/Deposit Ticket | Misc (G/L, Loans, Teller, Etc) |
| Check(s)/Deposit(s)<30 Items | Cash Letter Reconstruction |
| Statements and<30 Items | Lockbox |
| Statements and>30 Items | Legal Statement Only |
| Deposit Reconstruction | Legal Statement and Items |
| Regardless of Posting Date | |
| Missing Transactions | Returned Items |
| Online (Backdated/Unposted) | Encoding Error/Wrong Account |
| EXIT FUNCTION | |

Alternatively, when the particular numerical sequence of the financial document is greater than the predetermined numerical value, the employee selects an exit function at the primary interface. The exit function distinguishes that the request is to be sent to an outsourcing third party entity. Upon selection of the exit function at the primary interface, a secondary interface, inter-linked with the exit function, is initiated. The secondary interface is inter-linked with the off-site storage system. The employee inputs identification data into the secondary interface and selects the requested document. Also, the secondary interface preferably provides an option for the employee to select among several different output formats. Preferably, routing, or service codes will be generated automatically upon the initiation of the secondary interface and the inputting of the identification data into the secondary interface. The routing codes enable the bank to recognize that the request is being sent to the outsourced third party entity. Furthermore, the routing codes are configured to automatically forward the inputted identification data to the off-site storage system. The inputted identification data and the routing codes are forwarded into the mainframe computer 12 introduced above for temporary storage before transfer to the off-site storage system. This temporary storage also serves to defend against unexpected power outages, computer malfunctions, and the like. In the preferred embodiment of the subject invention, the secondary interface appears as follows and includes the identification data detailed below:

| Account Number: | Prod Type: |
| --- | --- |
| Account Name: | Customer Code: |
| Address: | |
| City: State: | Zip Code: |
| Home Phone: ( ) | Work Phone: ( ) |
| Fax: ( ) | |
| Service Code: | |
| For Items Posted Prior to a Year | |
| Copy of Statement Only | Savings Items |
| Copy of Check/Deposit Ticket | Misc (G/L, Loans, Teller, Etc) |
| Check(s)/Deposit(s)<30 Items | Cash Letter Reconstruction |
| Statements and<30 Items | Lockbox |
| Statements and>30 Items | Legal Statement Only |
| Deposit Reconstruction | Legal Statement and Items |

Once the bank employee has inputted the necessary identification data into either the primary or secondary interface, then retrieval of the financial document can continue. Specifically, the requested financial document is retrieved as defined by the inputted identification data. Two separate document retrieval procedures are discussed hereinbelow. One document retrieval procedure is for the financial documents having a record date earlier than or equal to the pre-selected date—one year before the current date in this example. The other document retrieval procedure is for the financial documents having a record date later than the pre-selected date. As discussed above, the one year timing selected for the pre-selected date is simply shown as an example and any suitable time frame may be utilized. In fact, even all financial document retrievals may be outsourced to the third party entity. As also discussed above, the two separate document retrieval procedures will typically operate simultaneously.

With reference to the subject example, if the record date of the financial document is earlier than or equal to one year before the current date, the remaining steps occur at the bank. As discussed above, these steps are known as the back office production of the bank. The request is first categorized by a research automation system. The research automation system automates the entire workflow of a bank's research and photocopy departments by sending requests to the appropriate sequence for processing. The downloading terminal 14 serves to perform the research automation system's tasks.

Photocopy requests are routed to an image control system, statement requests are sent to a document retrieval system, and requests for financial adjustments are routed to an adjustment system. The document terminal 16 serves to perform these tasks. In the illustrated embodiment of the subject invention, the sample document request is for a paid check. Hence, the categorized sequence will be the image control system which handles photocopy requests.

Referring now to FIG. 3, after the request is categorized, the request is verified for completeness and accuracy. If the request is not complete then additional data is retrieved. The additional data is retrieved by using a sequence number retrieval system and/or an all items research system. Once the request is complete and accurate, then the image reference number can be determined. That is, once the request is complete and accurate, then the requested financial document can be electronically located in the on-site storage system. The reference number may be a routing, sequence, or any other type of indicator. The reference number is determined by the image control system. The image control system is an image retrieval and routing management system which works in conjunction with Kodak's IMAGELINK™ Digital Workstations (IDW). Specifically, the image control system first connects to a network node. The network node is any type of storage device as is known in the art. Preferably a Kodak network node is used. The network node drives the IDW to find the location of the image by using the reference number. Specifically, the employee is prompted to verify that the correct media is loaded in the IDW such that the IDW can locate the image. The reference number for the document is known and the document image is now verified and located.

The requested image can now be retrieved and reproduced. In other words a copy of the digitized document (the check) is created. The copy may be created by manually pulling the microfilm, microfiche, or the like and photocopying the document. The copy may also be made by printing the document from a digitized record. The photocopy of the check is then distributed to the requesting client or other end user of the financial institution. Other end users of the financial institution include, but are not limited to, other financial institutions and federal and state governments. Additional information such as a photocopy report, a statement of charges, a research report and/or a daily status report may also be produced for the requesting client, the other end user, and/or the financial institution. The document retrieval system incorporated at the bank and the method for obtaining electronically-stored financial documents from the on-site storage system is now completed.

Continuing with the subject example, if the record date of the financial document is later than one year before the current date, the automated retrieval of the financial document is outsourced to the third party entity. To begin, a separate file is automatically generated at the bank by the input of the identification data into the secondary interface. Referring specifically to FIG. 4, the routing codes direct the request created on the separate file to be routed separately to the outsourced third party entity. In the preferred embodiment of the subject invention, additional user ID's are created to allow only selected users into the secondary interface. The identification data stored in the separate file and the routing codes are downloaded to the off-site storage system for retrieval of the requested financial documents by the outsourced downloading terminal 18. Preferably, the identification data and routing codes are grouped into batches of common requests for optimum retrieval of the requested financial document by the outsourced third party entity at the off-site storage system. The downloading step may occur at any suitable predetermined interval. Preferably, the downloading will occur three times a day. The downloaded documents are known in the industry as a basket of requests.

The subject method further includes the step of creating a back-up file of the downloaded identification data and routing codes in the off-site storage system. The back-up file acts as an emergency information source in case the mainframe computer 12 at the financial institution has a catastrophic failure. In addition, the outsourced third party entity is in direct connection with the mainframe computer 12 of the bank wherein the outsourced third party entity may produce a backup directory of each database file. This database backup is an additional safe guard for the financial institution.

The downloaded identification data and routing codes are then categorized for processing in the off-site storage system. The research automation system categorizes this information in a like fashion as discussed above. In fact, the outsourced third party entity uses the same computer software package as the financial institution such that the flow of information is optimum and not interrupted. As discussed above, the subject example request is for a paid check. Hence, the request will be categorized into the image control system and a sequence number will be determined by the sequencing terminal 20. Also, a status to update the progress of the requested financial document is provided to the financial institution.

After the request is categorized, the request, specifically the inputted identification data, is verified for completeness and accuracy. If the request is not complete or accurate, then additional data is retrieved. In a similar fashion as above, the additional data is retrieved by using the sequence number retrieval system and/or the all items research system. As appreciated, the outsourced third party entity may retrieve this information from the mainframe computer 12, via its direct line, or from its own backup database files. Once the request is complete and accurate, the image reference number can be determined. Again, as above, the reference number is determined by the image control system.

The requested image is then retrieved. More specifically, the requested financial document is electronically located in the off-site storage system. Additionally, the requested financial document is also reproduced after the document is electronically located in the off-site storage system by the outsourced document terminal 22. In other words, a copy of the digitized document (the check) is created. A status file is then created for the completed transaction. Also, a status of the request is sent to the financial institution wherein the institution may update their records. The status updates, as well as the information connections, create a two way information exchange between the outsourced third party entity and the bank.

The photocopy of the check is then distributed or digitally transferred to the requesting client, the financial institution, or other end users of the financial institution. In the preferred embodiment of the subject invention, the photocopy of the request is distributed to the requesting client, etc. based on the routing codes. That is, in addition to directing the request to be separately routed to the outsourced third party entity, the routing codes also indicate an appropriate distribution for the request client or other end user. The request is now completed.

A special circumstance occurs when the record date of one portion of the client's request is earlier than or equal to one year before the current date, and when the record date of another portion of the client's request is later than one year before the current date. These types of requests are known in the industry as spanned requests. One solution is to incorporate an additional interface utilized when the employee of the bank is utilizing the computer terminal 11 and comparing the specific document parameter of the requested financial document to the predetermined parameter to determine if the specific document parameter is greater than, less than, or equal to the predetermined parameter. If the request is a spanned request, then the request will be split into two separate requests which can be handled simultaneously. A special notation would be put onto the requests such that they may be put back together before distributing the documents to the client or other end user. Another solution simply notifies the inputting employee that two requests should be entered separately. A third solution sends the request to the back office production at the bank wherein the back office employees notify the outsourced third party entity by a separate request to retrieve the requested financial documents.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of obtaining an electronically-stored financial document from one of a first storage system and a second storage system with the first and second storage systems being different from each other wherein the first and second storage systems each include a plurality of financial documents stored therein and wherein each of the financial documents is associated with at least one specific document parameter, said method comprising the steps of:

storing a plurality of financial documents in a first fixed medium at the first storage system when the specific document parameter of the financial document is greater than a predetermined parameter;

storing a plurality of financial documents in a second fixed medium at the second storage system when the specific document parameter of the financial document is less than or equal to the predetermined parameter;

utilizing, through a user, a computer terminal connected to the first and second storage systems through a processing unit;

submitting a request for at least one of the stored financial documents into the computer terminal;

comparing the specific document parameter of the requested financial document to the predetermined parameter to determine if the specific document parameter is greater than, less than, or equal to the predetermined parameter after the request has been submitted;

accessing the first storage system through the processing unit when the specific document parameter is greater than the predetermined parameter and accessing the second storage system through the processing unit when the specific document parameter is less than or equal to the predetermined parameter; and retrieving the requested financial document, as defined by the submitted request, in the first fixed medium when the specific document parameter is greater than the predetermined parameter and in the second fixed medium when a specific document parameter of the financial document is less than or equal to the predetermined parameter.

2. A method as set forth in claim 1 wherein the first and second fixed mediums are different from each other.

3. A method as set forth in claim 2 wherein the step of storing a plurality of financial documents in a first fixed medium is further defined as storing a plurality of financial documents on a physical media.

4. A method as set forth in claim 3 wherein the step of storing a plurality of financial documents in a first fixed medium is further defined as storing a plurality of financial documents on one of microfilm and microfiche.

5. A method as set forth in claim 3 wherein the step of storing a plurality of financial documents in a second fixed medium is further defined as electronically storing the plurality of financial documents in a fixed electronic medium.

6. A method as set forth in claim 5 wherein the step of storing a plurality of financial documents in a second fixed medium is further defined as electronically storing the plurality of financial documents on an electronic disc media.

7. A method as set forth in claim 5 wherein the step of storing a plurality of financial documents in a second fixed medium is further defined as electronically storing the plurality of financial documents in an electronically retrievable memory.

8. A method as set forth in claim 2 wherein the step of storing a plurality of financial documents in a first fixed medium is further defined as electronically storing the plurality of financial documents in a fixed electronic medium.

9. A method as set forth in claim 8 wherein the step of storing a plurality of financial documents in a second fixed medium is further defined as storing a plurality of financial documents on one of microfilm or microfiche.

10. A method as set forth in claim 1 wherein the first and second fixed mediums are the same.

11. A method as set forth in claim 10 wherein the step of storing a plurality of financial documents in a first fixed medium is further defined as electronically storing the plurality of financial documents in a first fixed electronic medium, and wherein the step of storing a plurality of financial documents in a second fixed medium is further defined as electronically storing the plurality of financial documents in a second fixed electronic medium.

12. A method as set forth in claim 1 wherein the specific document parameter of the financial document is a particular numerical sequence.

13. A method as set forth in claim 12 wherein the specific document parameter of the financial document is a specific document age.

14. A method as set forth in claim 13 wherein the specific document age of the financial document is a record date of the financial document and the predetermined parameter is a pre-selected date.

15. A method as set forth in claim 12 wherein the specific document parameter of the financial document is selected from the group of a specific account number, a specific check number, a specific payment date and a specific monetary amount.

16. A method as set forth in claim 1 further including the step of reproducing the requested financial document after the requested financial document has been retrieved from the accessed storage system.

17. A method as set forth in claim 1 wherein the step of accessing the first and second storage systems is further defined as accessing only one of the storage systems at any one time to locate the requested financial document.

18. A method for a financial institution to obtain a stored financial document from one of an off-site storage system and an on-site storage system with the off-site and on-site storage systems being different from each other wherein the financial document is associated with at least one specific document parameter with the specific document parameter being defined as a specific document age, said method comprising the steps of:

maintaining the financial document in the off-site storage system when the specific document age of the financial document is less than a predetermined age;

maintaining the financial document in the on-site storage system when the specific document age of the financial document is greater than or equal to the predetermined age;

utilizing a computer terminal associated with the financial institution and connected to the off-site and on-site storage systems through a processing unit;

submitting a request for the financial document into the computer terminal;

comparing the specific document age of the requested financial document to the predetermined age to determine if the specific document age is greater than, less than, or equal to the predetermined age after the request has been submitted;

automatically accessing the off-site storage system through the processing unit when the specific document age is less than the predetermined age and automatically accessing the on-site storage system through the processing unit when the specific document age is greater than or equal to the predetermined age; and automatically retrieving the requested financial document from the accessed storage system as defined by the submitted request.

19. A method as set forth in claim 18 further including the step of processing the request to locate the requested financial document.

20. A method as set forth in claim 19 further including the step of reproducing the requested financial document after the request has been processed and retrieved.

21. A method as set forth in claim 20 wherein the steps of processing the request, retrieving the requested financial document, and reproducing the requested financial document are controlled by an interlinked computer program.

22. A method as set forth in claim 18 further including the step of feeding the request from the computer terminal into the processing unit.

23. A method as set forth in claim 22 further including the step of downloading the request from the processing unit into a downloading terminal.

24. A method as set forth in claim 23 further including the step of transmitting the request from the downloading terminal to a document terminal.

25. A method as set forth in claim 24 further including the step of reproducing the requested financial document through the document terminal.

26. A method as set forth in claim 22 further including the step of categorizing the request.

27. A method as set forth in claim 22 further including the step of determining a sequence number of the requested financial document after the request has been submitted.

28. A method as set forth in claim 27 further including the step of determining an image reference number of the requested financial document.

29. A method as set forth in claim 18 wherein the step of retrieving the requested financial document is further defined by electronically locating the requested financial document in the on-site storage system.

30. A method as set forth in claim 18 wherein the step of automatically accessing the off-site and on-site storage systems is further defined as accessing only one of the storage systems at any one time to locate the requested financial document.

31. A method as set forth in claim 18 further including the step of storing the financial document in a fixed medium at one of the off-site and on-site storage systems based on the specific document age of the financial document.

32. A method as set forth in claim 31 wherein the step of storing the financial document in a fixed medium is further defined as electronically storing the financial document in a fixed electronic medium, on microfilm or on microfiche.

33. A method of obtaining an electronically-stored financial document from one of a first storage system and a second storage system with the first and second storage systems being different from each other wherein the first and second storage systems each include a plurality of financial documents stored therein and wherein each of the financial documents is associated with at least one specific document parameter, said method comprising the steps of:

storing a plurality of financial documents in a first fixed medium at the first storage system when the specific document parameter of the financial document is greater than a predetermined parameter;

storing a plurality of financial documents in a second fixed medium at the second storage system when the specific document parameter of the financial document is less than or equal to the predetermined parameter;

utilizing, without user intervention, a processing unit connected to the first and second storage systems;

submitting a request for at least one of the stored financial documents through the processing unit;

comparing the specific document parameter of the requested financial document to the predetermined parameter to determine if the specific document parameter is greater than, less than, or equal to the predetermined parameter after the request has been submitted;

accessing the first storage system when the specific document parameter is greater than the predetermined parameter and accessing the second storage system when the specific document parameter is less than or equal to the predetermined parameter; and retrieving the requested financial document, as defined by the submitted request, in the first fixed medium when the specific document parameter is greater than the predetermined parameter and in the second fixed medium when a specific document parameter of the financial document is less than or equal to the predetermined parameter.

34. A method as set forth in claim 33 wherein the first and second fixed mediums are different from each other.

35. A method as set forth in claim 34 wherein the step of storing a plurality of financial documents in a first fixed medium is further defined as storing a plurality of financial documents on a physical media.

36. A method as set forth in claim 34 wherein the step of storing a plurality of financial documents in a second fixed medium is further defined as electronically storing the plurality of financial documents in a fixed electronic medium.

37. A method as set forth in claim 34 wherein the step of storing a plurality of financial documents in a first fixed medium is further defined as electronically storing the plurality of financial documents in a fixed electronic medium.

38. A method as set forth in claim 34 wherein the step of storing a plurality of financial documents in a second fixed medium is further defined as storing a plurality of financial documents on a physical media.

39. A method as set forth in claim 34 wherein the first and second fixed mediums are the same.

40. A method as set forth in claim 39 wherein the step of storing a plurality of financial documents in a first fixed medium is further defined as electronically storing the plurality of financial documents in a first fixed electronic medium, and wherein the step of storing a plurality of financial documents in a second fixed medium is further defined as electronically storing the plurality of financial documents in a second fixed electronic medium.

41. A method as set forth in claim 34 further including the step of reproducing the requested financial document after the requested financial document has been retrieved from the accessed storage system.

42. A method as set forth in claim 34 wherein the step of accessing the first and second storage systems is further defined as accessing only one of the storage systems at any one time to locate the requested financial document.

43. A method of obtaining an electronically-stored financial document from one of a first storage system and a second storage system with the first and second storage systems being different from each other wherein the first and second storage systems each include a plurality of financial documents stored therein and wherein each of the financial documents is associated with at least one specific document parameter, said method comprising the steps of:
    storing a plurality of financial documents in a first fixed medium at the first storage system when the specific document parameter of the financial document is less than a predetermined parameter;
    storing a plurality of financial documents in a second fixed medium at the second storage system when the specific document parameter of the financial document is greater than or equal to the predetermined parameter;
    utilizing a processing unit connected to the first and second storage systems;
    submitting a request for at least one of the stored financial documents through the processing unit;
    comparing the specific document parameter of the requested financial document to the predetermined parameter to determine if the specific document parameter is greater than, less than, or equal to the predetermined parameter after the request has been submitted;
    accessing the first storage system when the specific document parameter is less than the predetermined parameter and accessing the second storage system when the specific document parameter is greater than or equal to the predetermined parameter; and
    retrieving the requested financial document, as defined by the submitted request, in the first fixed medium when the specific document parameter is less than the predetermined parameter and in the second fixed medium when a specific document parameter of the financial document is greater than or equal to the predetermined parameter.

44. A method as set forth in claim 43 wherein the first and second fixed mediums are different from each other.

45. A method as set forth in claim 44 wherein the step of storing a plurality of financial documents in a first fixed medium is further defined as storing a plurality of financial documents on a physical media.

46. A method as set forth in claim 44 wherein the step of storing a plurality of financial documents in a second fixed medium is further defined as electronically storing the plurality of financial documents in a fixed electronic medium.

47. A method as set forth in claim 44 wherein the step of storing a plurality of financial documents in a first fixed medium is further defined as electronically storing the plurality of financial documents in a fixed electronic medium.

48. A method as set forth in claim 44 wherein the step of storing a plurality of financial documents in a second fixed medium is further defined as storing a plurality of financial documents on a physical media.

49. A method as set forth in claim 43 wherein the first and second fixed mediums are the same.

50. A method as set forth in claim 49 wherein the step of storing a plurality of financial documents in a first fixed medium is further defined as electronically storing the plurality of financial documents in a first fixed electronic medium, and wherein the step of storing a plurality of financial documents in a second fixed medium is further defined as electronically storing the plurality of financial documents in a second fixed electronic medium.

51. A method as set forth in claim 43 further including the step of reproducing the requested financial document after the requested financial document has been retrieved from the accessed storage system.

52. A method as set forth in claim 43 wherein the step of accessing the first and second storage systems is further defined as accessing only one of the storage systems at any one time to locate the requested financial document.

53. A method of accessing an electronically-stored financial document from one of a first storage system and a second storage system with the first and second storage systems being different from each other wherein the first and second storage systems each include a plurality of financial documents stored therein and wherein each of the financial documents has an electronic image and is associated with at least one specific document parameter, said method comprising the steps of:
    storing a plurality of images of the financial documents in a first fixed medium at the first storage system when the specific document parameter of the financial document is greater than a predetermined parameter;
    storing a plurality of images of the financial documents in a second fixed medium at the second storage system when the specific document parameter of the financial document is less than or equal to the predetermined parameter;
    utilizing a processing unit connected to the first and second storage systems;
    receiving a request for an image of one of the stored financial documents into the processing unit;
    comparing the specific document parameter of the requested financial document to the predetermined parameter to determine if the specific document parameter is greater than, less than, or equal to the predetermined parameter after the request has been received;
    accessing the first storage system when the specific document parameter is greater than the predetermined parameter and accessing the second storage system when the specific document parameter is less than or equal to the predetermined parameter; and
    retrieving the image of the requested financial document from the accessed storage system as defined by the received request.

54. A method as set forth in claim 53 wherein the first and second fixed mediums are different from each other.

55. A method as set forth in claim 54 wherein the step of storing a plurality of financial documents in a first fixed medium is further defined as storing a plurality of financial documents on a physical media.

56. A method as set forth in claim 54 wherein the step of storing a plurality of financial documents in a second fixed medium is further defined as electronically storing the plurality of financial documents in a fixed electronic medium.

57. A method as set forth in claim 54 wherein the step of storing a plurality of financial documents in a first fixed medium is further defined as electronically storing the plurality of financial documents in a fixed electronic medium.

58. A method as set forth in claim 53 wherein the first and second fixed mediums are the same.

59. A method as set forth in claim 53 further including the step of distributing the retrieved financial document to a financial institution based on routing codes.

60. A method as set forth in claim 53 wherein the step of automatically accessing the first and second storage systems is further defined as accessing only one of the storage systems at any one time to locate the image of the requested financial document.

61. A method of accessing an electronically-stored financial document from one of a first storage system and a second storage system with the first and second storage systems being different from each other wherein the first and second storage systems each include a plurality of financial documents stored therein and wherein each of the financial documents has an electronic image and is associated with at least one specific document parameter, said method comprising the steps of:

storing a plurality of images of the financial documents in a first fixed medium at the first storage system when the specific document parameter of the financial document is less than a predetermined parameter;

storing a plurality of images of the financial documents in a second fixed medium at the second storage system when the specific document parameter of the financial document is greater than or equal to the predetermined parameter;

utilizing a processing unit connected to the first and second storage systems;

receiving a request for an image of one of the stored financial documents into the processing unit;

comparing the specific document parameter of the requested financial document to the predetermined parameter to determine if the specific document parameter is greater than, less than, or equal to the predetermined parameter after the request has been received;

accessing the first storage system when the specific document parameter is less than the predetermined parameter and accessing the second storage system when the specific document parameter is greater than or equal to the predetermined parameter; and     retrieving the image of the requested financial document from the accessed storage system as defined by the received request.

62. A method as set forth in claim 61 wherein the first and second fixed mediums are different from each other.

63. A method as set forth in claim 62 wherein the step of storing a plurality of financial documents in a first fixed medium is further defined as storing a plurality of financial documents on a physical media.

64. A method as set forth in claim 62 wherein the step of storing a plurality of financial documents in a second fixed medium is further defined as electronically storing the plurality of financial documents in a fixed electronic medium.

65. A method as set forth in claim 62 wherein the step of storing a plurality of financial documents in a first fixed medium is further defined as electronically storing the plurality of financial documents in a fixed electronic medium.

66. A method as set forth in claim 61 wherein the first and second fixed mediums are the same.

67. A method as set forth in claim 61 further including the step of distributing the retrieved financial document to a financial institution based on routing codes.

68. A method as set forth in claim 61 wherein the step of automatically accessing the first and second storage systems is further defined as accessing only one of the storage systems at any one time to locate the image of the requested financial document.

\* \* \* \* \*